United States Patent
Zhang et al.

(12) United States Patent (10) Patent No.: US 9,850,816 B2
(45) Date of Patent: Dec. 26, 2017

(54) GAS TURBINE INLET SYSTEM AND RELATED METHOD FOR COOLING GAS TURBINE INLET AIR

(71) Applicant: General Electric Company, Schenectady, NY (US)

(72) Inventors: JIanmin Zhang, Greer, SC (US); Brad Aaron Kippel, Greer, SC (US)

(73) Assignee: General Electric Company, Schenectady, NY (US)

( * ) Notice: Subject to any disclaimer, the term of this patent is extended or adjusted under 35 U.S.C. 154(b) by 918 days.

(21) Appl. No.: 14/071,122

(22) Filed: Nov. 4, 2013

(65) Prior Publication Data

US 2015/0121881 A1     May 7, 2015

(51) Int. Cl.
F02C 7/143     (2006.01)

(52) U.S. Cl.
CPC ............ *F02C 7/143* (2013.01); *F02C 7/1435* (2013.01); *F05D 2260/234* (2013.01); *Y02E 20/16* (2013.01); *Y02T 50/675* (2013.01)

(58) Field of Classification Search
CPC .. F02C 7/143; F02C 7/1435; F05D 2260/234; F05D 2260/212; Y02T 50/675
See application file for complete search history.

(56) References Cited

U.S. PATENT DOCUMENTS

| | | | |
|---|---|---|---|
| 4,246,962 A | 1/1981 | Norback | |
| 4,427,607 A | 1/1984 | Korsell | |
| 5,143,658 A | 9/1992 | Thomas | |
| 5,632,148 A * | 5/1997 | Bronicki | F01K 23/10 60/728 |
| 8,196,907 B2 | 6/2012 | Zhang et al. | |
| 8,365,530 B2 | 2/2013 | Zhang et al. | |
| 2002/0106292 A1* | 8/2002 | Chowaniec | F02C 7/1435 417/403 |
| 2003/0150234 A1* | 8/2003 | Ohmi | F24F 5/0035 62/309 |
| 2009/0314256 A1* | 12/2009 | Bland | F02C 3/305 123/456 |
| 2010/0307164 A1* | 12/2010 | Zhang | F02C 7/1435 60/794 |
| 2010/0319384 A1* | 12/2010 | Zhang | F01D 25/007 62/271 |
| 2012/0031596 A1 | 2/2012 | Kippel et al. | |
| 2012/0216546 A1* | 8/2012 | Doebbeling | F01D 15/10 60/772 |

FOREIGN PATENT DOCUMENTS

| | | | | |
|---|---|---|---|---|
| EP | 1923651 A1 * | 5/2008 | ............. | F02C 7/052 |
| WO | 2006/066304 A1 | 6/2006 | | |

\* cited by examiner

*Primary Examiner* — Pascal M Bui Pho
*Assistant Examiner* — Kyle Thomas
(74) *Attorney, Agent, or Firm* — Nixon & Vanderhye P.C.

(57) ABSTRACT

An inlet air conditioning system for a gas turbine includes an inlet duct for the with an air flow path to provide inlet air to the gas turbine; evaporative cooling media disposed in the air flow path; a water chiller; and a circulation pump that circulates water through the water chiller and the evaporative media in series. The chiller is configured to chill the water to below ambient wet-bulb temperature before the water is circulated to the evaporative cooling media. A power plant includes a gas turbine including a compressor, a combustion system, and a turbine section; a load; and the inlet air conditioning system.

14 Claims, 5 Drawing Sheets

GAS TURBINE INLET SYSTEM AND RELATED METHOD FOR COOLING GAS TURBINE INLET AIR

BACKGROUND OF THE INVENTION

The subject matter disclosed herein relates generally to an inlet air conditioning system for a gas turbine and, particularly, to an inlet air conditioning system and method with improved cooling of the inlet air.

A gas turbine typically includes: an inlet system, a compressor section, a combustion section, a turbine section, and an exhaust section. A gas turbine may operate as follows. The inlet system receives air from the ambient environment of the gas turbine, and the compressor section compresses inlet air. The compressed airstream then flows to the combustion section where fuel mixing may occur, prior to combustion. The combustion process generates a gaseous mixture that drives the turbine section, which converts the energy of the gaseous mixture to mechanical energy in the form of torque. The torque is customarily used to drive an electrical generator, a mechanical drive, or the like.

Gas turbine performance is commonly determined by output, thermal efficiency, and/or heat rate. The temperature and humidity of the incoming airstream have a significant impact on the gas turbine performance. Generally, the gas turbine becomes less efficient as the temperature of the airstream increases.

Various systems have been utilized to reduce the inlet airstream temperature, particularly during ambient conditions that have higher airstream temperatures and/or humidity. These systems attempt to achieve this goal by conditioning the airstream prior to entering the compressor section. Conditioning may be considered the process of adjusting at least one physical property of the airstream. The physical property may include, but is not limited to: wet-bulb temperature, dry-bulb temperature, humidity, and density. By adjusting one or more physical properties of the airstream, performance of the gas turbine can be improved.

Some known examples of these systems include: media type evaporative coolers, fogger evaporative coolers, chiller coils with mechanical water chillers, absorption water chillers with or without thermal energy systems, and the like. There are a few concerns, however, with known systems for conditioning the airstream entering a gas turbine.

In related inlet air cooling systems for turbine engines, both sensitive cooling and evaporative cooling systems are used. Sensitive cooling systems typically employ water chillers and cooling coils disposed within the inlet air stream. These systems are highly functional but are often considered too expensive to implement, at least in part due to the high expense of the cooling coils and water chiller plant, which may cost in the millions of dollars to fabricate and install. Evaporative cooling systems are typically considerably less expensive to fabricate and install, but work most optimally in hot and dry environments because hot, dry air provides greater cooling capabilities than a relatively humid environment. Indeed, evaporative coolers may have been completely discounted for use in high humidity environments due to their relatively poor performance compared to their use in hot and dry environments. Related evaporative cooling systems relied upon readily available water, such as water from a nearby water supply where the temperature of the water supply is tied to ambient conditions.

U.S. Pat. No. 8,365,530 (the '530 patent) discloses a system that includes both sensitive cooling and evaporative cooling. The '530 patent discloses a system where water is sprayed onto a media surface, and the water may be cooled or the water may be supplied at ambient conditions. This approach differs, in part, from evaporative cooling in that the media is different and the way in which the water is delivered—conventional evaporative cooling does not employ spraying.

Prior to the work that led to the present disclosure, it was accepted within the art that there was no benefit, at least with respect to efficiency, to chilling water for use with an evaporative cooler. Therefore the results discussed below, where improved efficiency of an evaporative cooler was achieved by supplying chilled water to an evaporative cooling media, were surprising and a substantial breakthrough. Indeed, devices according to the present disclosure provide effective cooling even with relatively high ambient humidity contrary to the accepted wisdom with respect to related evaporative coolers.

BRIEF DESCRIPTION OF THE INVENTION

Aspects of the inlet cooling system described herein provide solutions to one or more problems or disadvantages associated with the prior art.

In one exemplary but non-limiting aspect, the present disclosure relates to an inlet air conditioning system for a gas turbine. The system comprises an inlet duct for the gas turbine where the inlet duct includes an air flow path to provide inlet air to the gas turbine; evaporative cooling media disposed in the air flow path; a water chiller; and a circulation pump that circulates water through the water chiller and the evaporative media in series. The chiller is configured to chill the water to below ambient wet-bulb temperature before the water is circulated to the evaporative cooling media.

In another exemplary but non-limiting aspect, the present disclosure relates to a power plant. The power plant comprises a gas turbine that includes a compressor, a combustion system, and a turbine section; a mechanical or electrical load; and an inlet system for the gas turbine. The inlet system comprises an inlet duct for the gas turbine, the inlet duct including an air flow path to provide inlet air to the gas turbine; evaporative cooling media disposed in the air flow path; a water chiller; and a circulation pump that circulates water through the water chiller and the evaporative media in series. The chiller is configured to chill the water to below ambient wet-bulb temperature before the water is circulated to the evaporative cooling media. The evaporative cooling media is optimized to provide a combination of evaporative and sensitive cooling.

In another exemplary but non-limiting aspect, the present disclosure relates to a power plant. The power plant comprises a gas turbine that includes a compressor, a combustion system, and a turbine section; a mechanical or electrical load; and an inlet system for the gas turbine. The inlet system comprises an inlet duct for the gas turbine, the inlet duct including an air flow path to provide inlet air to the gas turbine; evaporative cooling media disposed in the air flow path; a water chiller; and a circulation pump that circulates water through the water chiller and the evaporative media in series. The chiller is configured to chill the water to below ambient wet-bulb temperature before the water is circulated to the evaporative cooling media. All water that is delivered to the evaporative cooling media for conditioning the inlet air is chilled.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present disclosure may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present disclosure.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the figures. Indeed, the element or elements of an embodiment of the present disclosure may be oriented in any direction and the terminology, therefore, should be understood as encompassing such variations unless specified otherwise.

As used throughout the specification and claims, "substantially" and "about" include at least deviations from ideal or nominal values that are within manufacturing, operational and/or inspection tolerances.

The present disclosure may be applied to the variety of gas turbine engines that compress an ingested air, such as, but not limiting to, a heavy-duty gas turbine; an aero-derivative gas turbine; or the like. An embodiment of the present disclosure may be applied to either a single gas turbine engine or a plurality of gas turbine engines. An embodiment of the present disclosure may be applied to a gas turbine engine operating in a simple cycle or combined cycle.

Figure 1:
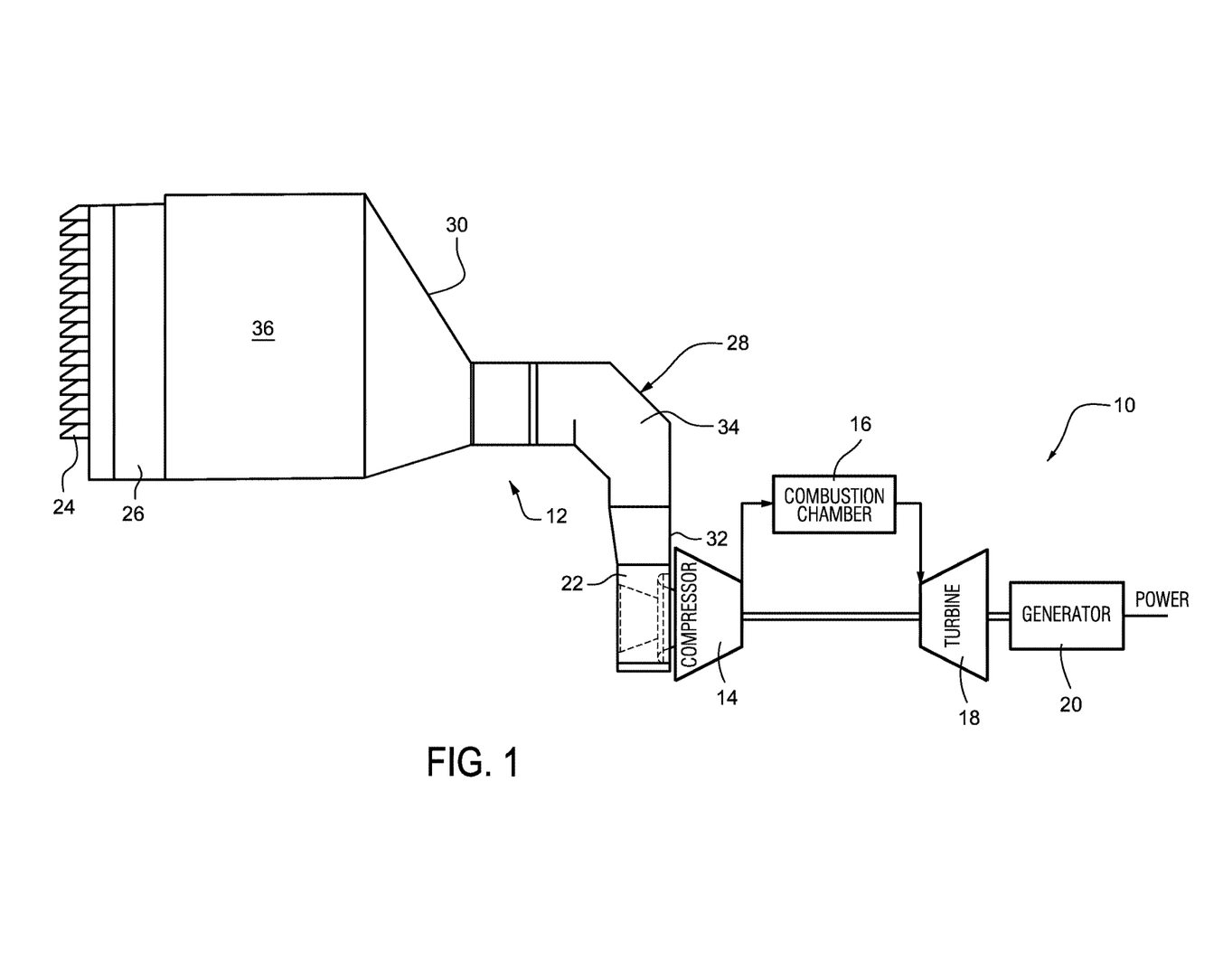
FIG. 1 is a simplified side elevation of an inlet system and a gas turbine engine shown schematically, in accordance with an exemplary but non-limiting aspect of the disclosure.

FIG. 1 illustrates a gas turbine engine 10 with an inlet system 12. The gas turbine engine 10 generally comprises a compressor 14, at least one combustor having a combustion chamber 16 and a turbine section 18. In land-based gas turbines, the turbine section 18 typically drives a generator 20. The compressor 14 is provided with an inlet that may include a plurality of inlet guide vanes (not shown) arranged downstream of an inlet plenum 22. The turbine section 18 is fluidly connected to an exhaust diffuser (not shown).

The inlet system 12 generally comprises a weather hood 24 mounted to an upstream end of an inlet filter house 26. The weather hood 24 is fluidly connected to the inlet plenum 22 via an inlet air duct 28. Inlet air duct 28 includes a first end portion 30 that extends to a second end portion 32 through an intermediate portion 34.

The inlet system 12 also includes an exemplary air cooling system 36. The details of the air cooling system are discussed in detail with respect to FIGS. 2 and 3 below.

Figure 2:
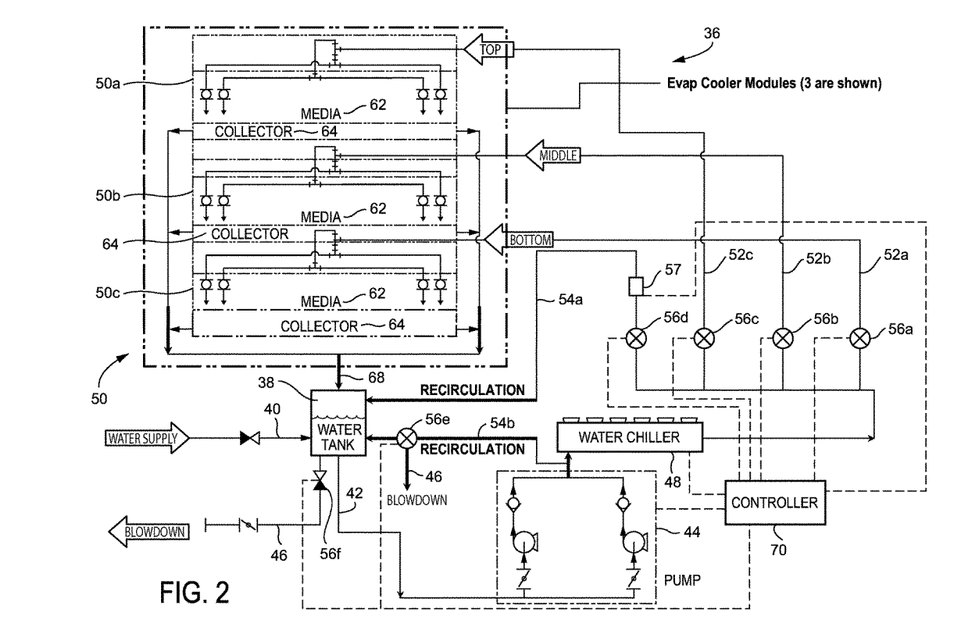
FIG. 2 is a schematic diagram of an inlet air cooling system in accordance with an exemplary but non-limiting aspect of the disclosure.

FIG. 2 schematically illustrates the air cooling system 36, which is generally in the form of a recirculation loop with several parallel flow branches. The cooling system 36 includes a water tank 38 for storage of water. Although water is referenced throughout this disclosure, other liquid cooling media could also be used, so long as the liquid cooling media possesses appropriate evaporative properties. Water can be pure water or water with various additives, which can be naturally occurring or added by a user to maintain desired chemical properties of the system. The water tank 38 includes an inlet 40 connected to a water supply. The water supply allows for replenishment of the water flowing through the cooling system 36 that is depleted due to evaporation or other losses. The water tank 38 includes a first outlet 42 for flowing water through the cooling system 36. The water tank 38 also includes a second outlet 46 for blowdown, which allows the system to decrease water for any reason. The inlet 40 and second outlet 46 may be located at any convenient location within the system that allows for adding and removing water to the system. The two outlets 46 may also be combined into a single connection if preferred.

The cooling system 36 also includes a pump module 44. In FIG. 2, two pumps are illustrated schematically within the module, but any number of pumps can be used as will be dictated by the needs of the system. The pump module (or simply "pump") 44 draws water from the water tank 38 and supplies the water to a chiller 48. Although the pump 44 is illustrated between the water tank 38 and the chiller 48, the pump 44 could be located anywhere that provides adequate performance for the system. As would be appreciated by those skilled in the art, locating the pump 44 upstream of the chiller 48 will allow the chiller 48 to compensate for any heat added to the water by the pump 44.

The chiller 48 chills the water using known cooling techniques and can include, but is not limited to, a mechanical chiller, heat pump, underground water storage tank, cold water runoff from snow melt, an absorption chiller, an ice storage system, or any combination of these or other suitable technologies. In an exemplary but non-limiting example, the chiller 48 is configured to cool water to below ambient wet-bulb temperature. The temperature may be any temperature below the ambient wet-bulb temperature and may be optimized based upon trading off parasitic power drained from the gas turbine engine 10 versus increases in efficiency through cooling the inlet air to the gas turbine engine 10. For example, the chiller 48 may cool the water to about 10 to 40 degrees Fahrenheit, or 15 to 20 degrees Fahrenheit, below ambient wet-bulb temperature.

After exiting the chiller 48, the water flows at least to an evaporative cooling module 50, discussed in detail below. The cooling system 36 may include multiple functionally parallel flow paths 52a, 52b, 52c after exiting the chiller 48. One of the functionally parallel flow paths may be a recirculation loop 54a. The recirculation loop 54a provides a flow path that bypasses all evaporative cooling modules 50. Such a recirculation loop 54a can allow for excess capacity (flow and/or chilling) to bypass the evaporative cooling modules 50 to store additional cooled water for later use, for example, during peak cooling demand. The recirculation loop 54a can allow for one or more evaporative cooling modules 50 to have water flow shut off while the pump 44 remains operational, which can allow, for example, for maintenance to be performed on an evaporative cooling module 50 without stopping the pump 44. A recirculation loop 54a can maintain a desired water temperature entering chiller 48 for an optimized water chilling process. Each of the functionally parallel flow paths 52a, 52b, 52c and the recirculation loop 54a is illustrated with an exemplary but non-limiting valve 56a, 56b, 56c, 56d. Any sort of control element or measuring element may be included, or omitted, to facilitate separate control and/or monitoring of these flow paths. For example, one or each of the valves 56a, 56b, 56c, 56d could be replaced with an orifice plate or an orifice plate with a bypass line. Optional conductivity sensor(s) 57 may be added to any line. The recirculation loop 54b bypasses the chiller 48 as illustrated by the line 54b. The recirculation loop 54b may also include a three-way valve 56e that allows the recirculation loop to connect to the water tank 38 or allows blow down. The recirculation loops 54b maintains constant flow through the chiller 48 and the flows to evaporative cooler modules 50a, 50b and 50c no matter the 3-way valve 56e opens blowdown line or not.

FIG. 2 illustrates three vertically stacked evaporative cooling modules 50: a top module 50a, a middle module 50b, and a bottom module 50c located in the inlet air duct 28. The three evaporative cooling modules 50 are fluidly connected to chiller 48 such that water flows to the three evaporative cooling modules 50 in a functionally parallel manner. Thus, as illustrated, the cooling water is split into three parallel branches before being delivered to the three evaporative cooling modules 50, and the three parallel branches are also functionally parallel to the recirculation loop 54a. With a vertically stacked arrangement, the chilled water enters, contacts, or mixes with the airstream at multiple locations, which results in a greater portion of the air interacting with the chilled water and increases the effect of the chilled water.

Although three evaporative cooling modules 50 are illustrated, any number of evaporative cooling modules can be provided. Three evaporative cooling modules 50 are discussed for ease of illustration only and should not be considered limiting. Including a plurality of evaporative cooling modules 50 (two or more) may provide advantages over a single evaporative cooling module 50. As discussed in greater detail below, a plurality of evaporative cooling modules 50 allows for optimization of the amount of sensitive cooling achieved by the evaporative cooling modules 50 versus cost and/or complexity of the overall system.

Figure 3:
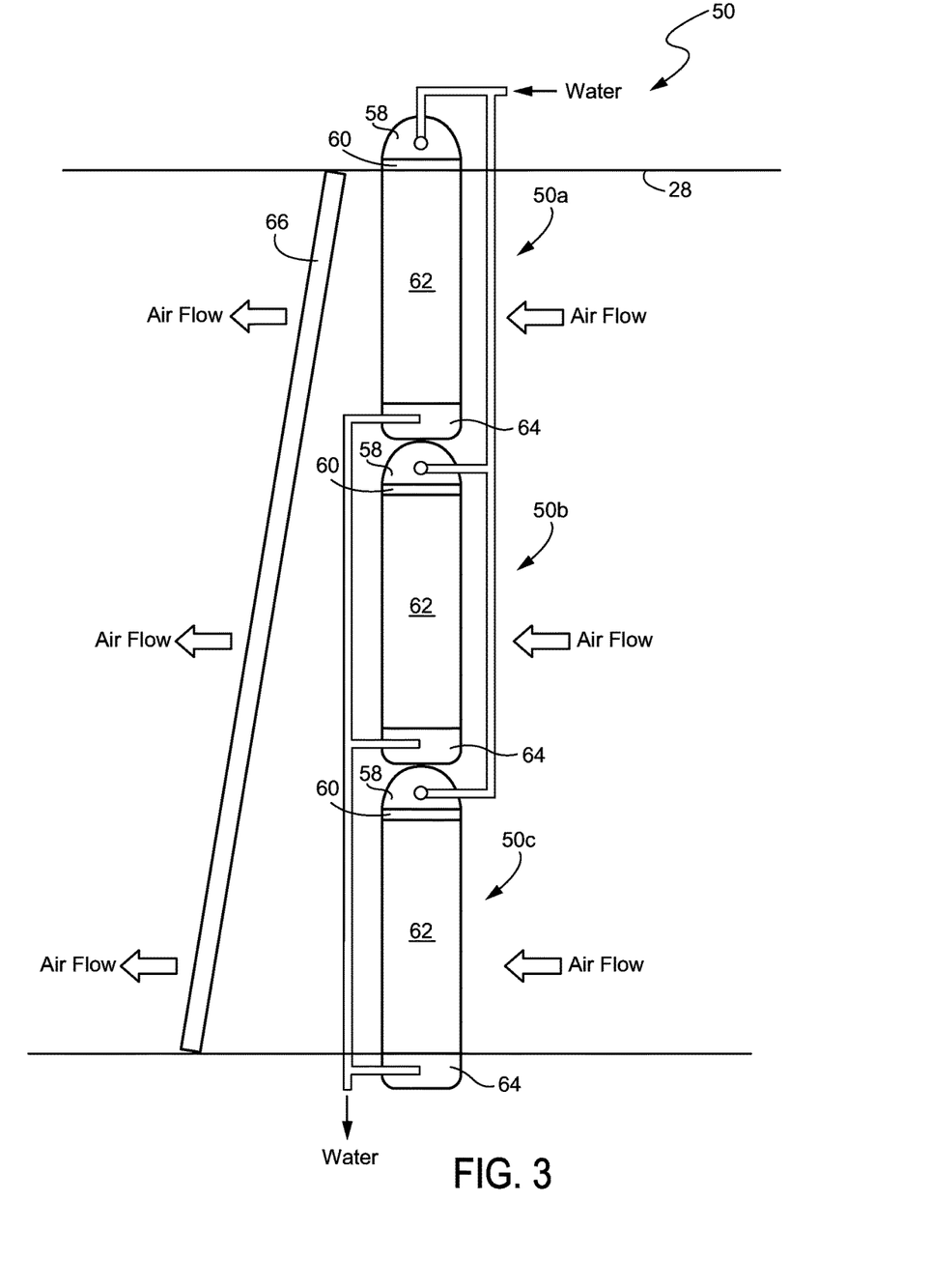
FIG. 3 is a simplified representation of an evaporative cooling module and associated structures of the disclosure.

Moving to FIG. 3, three exemplary, but non-limiting evaporative cooling modules 50 are illustrated disposed within the inlet air duct 28. The modules 50 are illustrated as vertically aligned, but they may be in any substantially vertically stacked arrangement that results in substantially all of the air flowing through at least one of the modules 50 as the air passes through the inlet air duct 28. For example, the modules 50 could be vertically aligned (as illustrated) or slightly offset such that any portions of the modules 50 that do not allow air flow are overlapped with one another to reduce air flow obstructions. Water flows into the evaporative cooling module 50 via a supply manifold 58 and then to a distribution layer 60. The distribution layer 60 ensures relatively even distribution of water to the evaporative media 62. The supply manifold and/or the distribution layer 60 serve as a water inlet to the evaporative media. The water flows from the top of the evaporative media 62 adjacent to the distribution layer 60 towards the bottom of the distribution layer 60, aided by gravity, and collects in the collector 64. Air also flows through or across the evaporative media 62 generally perpendicular to the direction that the water flows. The air and water are allowed to contact and/or mix, resulting in evaporation of the water and consequent evaporative cooling of the air. An optional mist eliminator 66 may be provided downstream of the evaporative media 62 to remove water droplets entrained in the air stream.

If water exits the distribution layer 60 at a temperature below the ambient wet-bulb temperature, the water will have a temperature distribution profile that increases in temperature as it flows down the evaporative media 62 and will eventually reach a point close to the wet bulb temperature of the air flowing through the evaporative media. Even if some water that is not chilled is delivered to the evaporative cooling media 62 along with chilled water, the net effect will be that all water that is delivered to the evaporative cooling media 62 is chilled because of mixing. The relatively cold water towards the top of the evaporative media 62 provides dominantly sensitive cooling because of a temperature difference between the cooling water and air flow. Towards the bottom of the evaporative media, where the water has reached a point close to the wet bulb temperature of the air flow, substantially evaporative cooling dominates because there is a smaller temperature difference to cause sensitive cooling. This can lead to the surprising effect where the evaporative cooling modules 50 have an evaporative cooling efficiency that is greater than 100% with respect to traditional evaporative coolers. Here, traditional efficiency of an evaporative cooler is defined as Efficiency=[(T1−T2)/(T1−T3)]×100, where T1=entering air dry bulb temperature, T2=leaving air dry bulb temperature; and T3=entering air wet-bulb temperature. Thus, greater than 100% efficiency according to the present disclosure is achieved when cooling is greater than the cooling achieved using evaporative cooling without chilled water, i.e., the collective T2 is lower than T3 with chilled water supply.

By introducing the chilled water at multiple locations, relatively more area with cold water can be achieved in a given height than if cooled water is only introduced at a portion of the evaporative media 62 corresponding to a top portion of the inlet air duct 28. This can be achieved by stacking multiple evaporative cooling modules 50 above one another in the inlet air duct as shown in FIG. 3 and is an exemplary, but non-limiting way to achieve vertically distinct sections of evaporative media 62.

Figure 4:
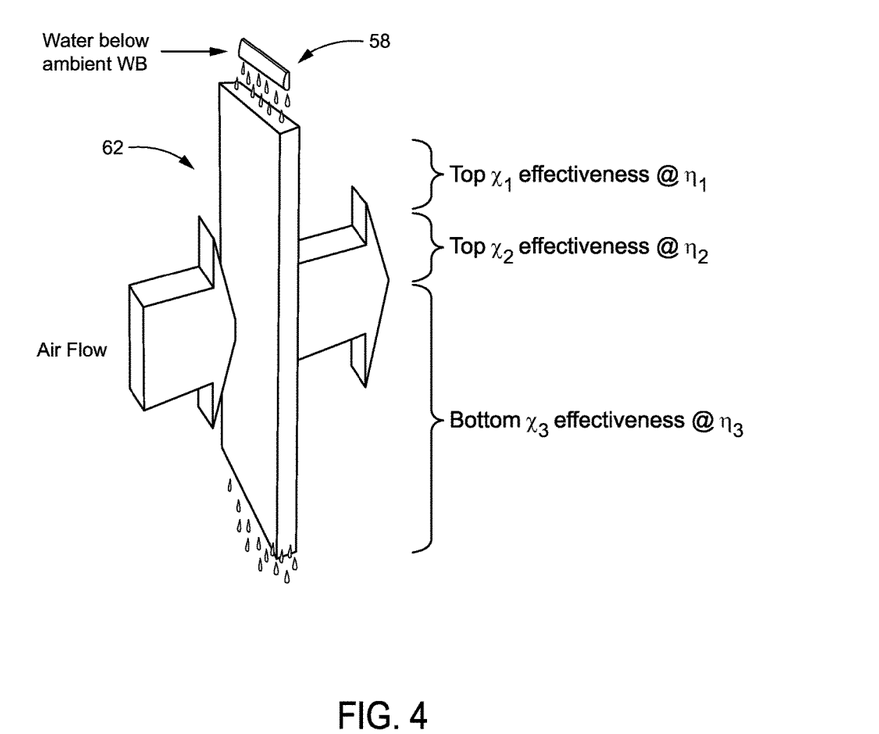
FIG. 4 is a representation of evaporative media and cooling effectiveness over the vertical direction of the evaporative media.

The height of evaporative cooler module depends on the efficiency desired for a specific application condition. As illustrated in FIG. 4, the overall effectiveness η can be determined using the following formula:

$$\eta = [x_1/(x_1+x_2+x_3)]\eta_1 + [x_2/(x_1+x_2+x_3)]\eta_2 + [x_3/(x_1+x_2+x_3)]\eta_3,$$

where $\eta_3 < \eta_2 < \eta_1$ and $\eta_3 < \eta < \eta_1$. $x_1$ is the section of the height (i.e., a vertical length) of the evaporative media 62 where air that passes through the evaporative media 62 is cooled predominantly by sensitive cooling. $x_2$ is the section of the height of the evaporative media 62 where air that passes through the evaporative media 62 is cooled by a mix of evaporative cooling and sensitive cooling. $x_3$ is the section of the height of the evaporative media 62 where air that passes through the evaporative media 62 is cooled predominantly by evaporative cooling. $x_1$, $x_2$ and $x_3$ will be determined based upon the overall height of the evaporative media 62. $x_1$, $x_2$ and $x_3$ correspond to $\eta_1$, $\eta_2$ and $\eta_3$, respectively. In an example, $x_1 = x_2$ with $x_3$ being the remainder of the height of the evaporative media 62.

Returning to FIGS. 2 and 3, the middle module 50b is disposed above the bottom module 50c and the top module 50a is disposed above the middle module 50b. This stacked configuration is disposed within the inlet system 12 and/or within the inlet air duct 28 so that the stacked evaporative cooling modules 50 have parallel air flow through the evaporative cooling modules 50. As the water flows through each of the evaporative cooling modules 50, the water is then combined and returned to the water tank 38 via a return line 68.

FIG. 2 also illustrates a controller 70 that includes control logic and other control necessary for controlling and operating the cooling system 36. The controller 70 may be a stand alone controller or may be integrated into an overall control system for a larger overall system such as a power plant. As illustrated, the controller 70 includes control for the pump 44 and valves 56a, 56b, 56c, 56d to control flow through the evaporative cooling modules 50 and recirculation loop 54a. Alternatively, one or more of the valves 56a, 56b, 56c, 56d may be adjusted during installation and fixed thereafter or any other suitable passive or active method for balancing the respective flow rates may be employed. The controller may control water flow rates by controlling a pumping rate of the pump 44 and/or controlling overall flow distribution between the recirculation loop 54a and the evaporative cooling modules 50. The controller can be in the form of a general purpose computer with appropriate software and/or dedicated analogue, digital or mechanic control components. Through input from 57 the controller may blow down (remove water) from the system via valves 56e and/or 56f.

Figure 5:
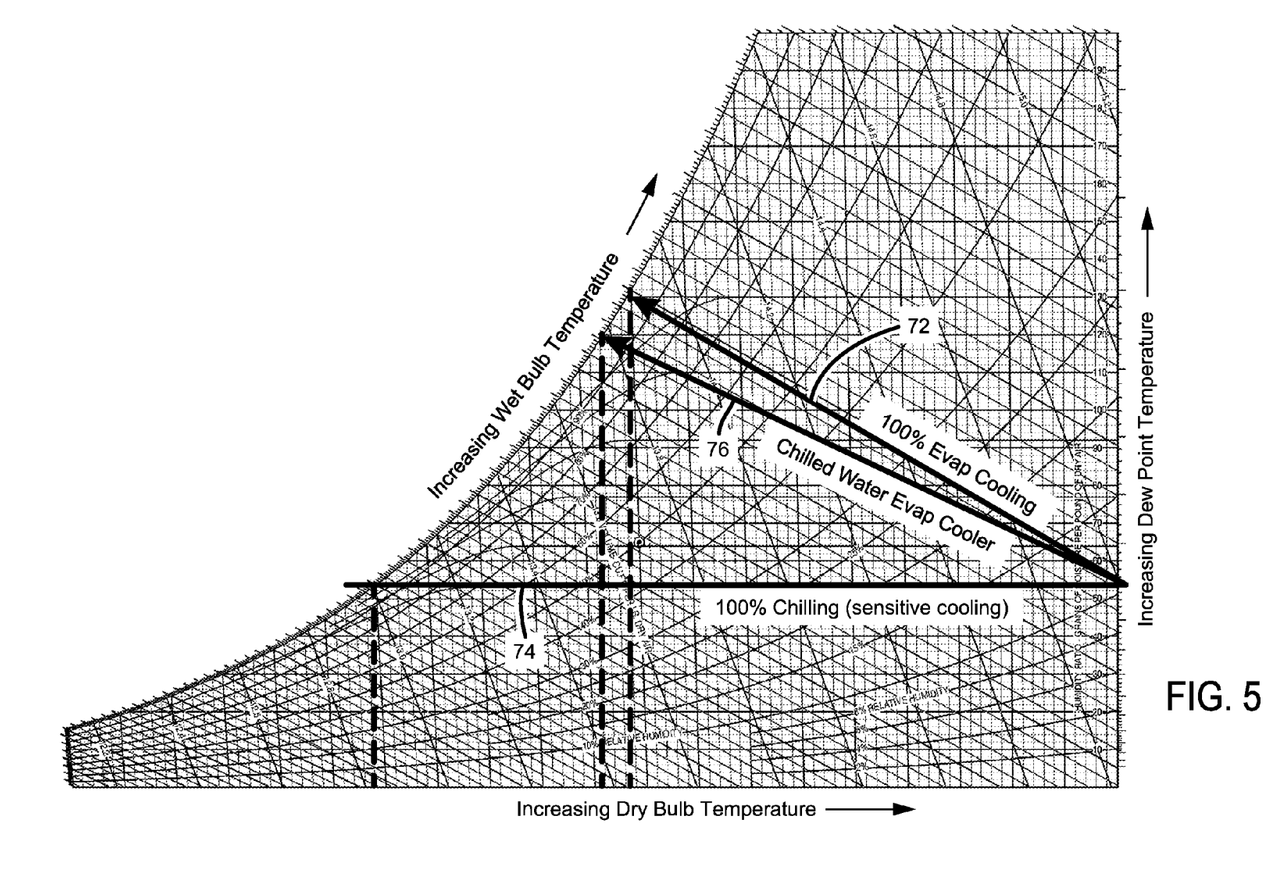
FIG. 5 is a simplified psychrometric chart with exemplary but non-limiting examples.

FIG. 5 (a simplified psychrometric chart) is illustrative of the differences between the present disclosure, pure evaporative cooling and sensitive cooling. The chart includes a first line 72 for 100% evaporative cooling, which follows a line corresponding to an iso-enthalpy line on the graph. A second line 74 corresponds to cooling using sensitive cooling or 100% chilling, which follows a horizontal line corresponding to a given dew point temperature. This line is indicative of a traditional system using a mechanical chiller and chiller coils for cooling the inlet air. A third line 76, corresponding to the present disclosure, labeled as chilled water evap cooler, is an amalgamation of traditional evaporative cooling and sensitive cooling. The third line 76 falls somewhere between the first line 72 and second line 74. Where each of the lines intersects the upper-left curved boundary of the graph corresponds to the dry bulb temperature (the bottom edge of the graph) that can be achieved with the respective type of cooling.

As indicated by the dashed lines, 100% evaporative cooling results in the highest dry bulb temperature, 100% chilling results in the lowest dry bulb temperature, and 105% EC lies in between.

Typically, 100% evaporative cooling systems have a flow rate of cooling water that is between 1 and 2 gallons per minute (e.g., about 1.5 gallons per minute) per square foot of area of a top surface of the evaporative media 62 (the area in FIG. 3 facing the distribution layer 60), and the water was not cooled (i.e., was used at what ever temperature was readily available). In a typical 100% sensitive cooling system, the flow rate of cooling water is typically about 4.5 gallons per minute per square foot of area of a top surface of the media, and the water was cooled to temperatures of about 45 degrees Fahrenheit. As would be appreciated, the 100% sensitive cooling system requires considerably more parasitic power than a 100% evaporative system because of the greater flow rate and additional power required for cooling.

With the present disclosure, between about 0.5 and 10 gallons per minute (e.g., between 1 and 2 gallons per minute, e.g., about 1.5 gallons per minute) per square foot of area of a top surface of the evaporative media 62 may be supplied, which is chilled to below ambient wet-bulb temperature. The parasitic power to chill and pump the water is comparable to that of a 100% evaporative cooling system. Also, the parasitic power for chilling is lower than that required for a 100% sensitive cooling system because the flow rate is lower and because the water does not have to be chilled to as low a temperature. The temperature for cooling the water according to the present disclosure can be optimized based upon efficiency gains versus parasitic power consumption. Exemplary temperatures may be between about 10 to 40 degrees Fahrenheit below the ambient wet-bulb temperature, e.g., 15 to 20 degrees Fahrenheit below the ambient wet-bulb temperature, but could be greater or less depending upon design considerations. For example, the cooling water could be cooled to be at least 15 degrees Fahrenheit below ambient wet-bulb temperature, or the cooling water could be cooled to be at least 20 degrees Fahrenheit below ambient wet-bulb temperature.

With traditional evaporative cooling systems, the turbine air depression of the system decreased as ambient humidity increased. Very surprisingly, with the present disclosure, even in a high humidity ambient environment, a system with evaporative cooling media and chilled water can still achieve effective cooling performance. This is achieved at least in part due to some sensitive cooling being provided by the chilled water.

As would be appreciated by those skilled in the art, the present disclosure provides several benefits. A system can be provided that has relatively low expense, similar to a system using only evaporative cooling, while achieving greater cooling efficiency that a traditional evaporative cooling system. Viewed in another way, a traditional sensitive cooling system (a system with a chiller and cooling coils) can have the relatively expensive cooling coils replaced with relatively inexpensive evaporative cooling media.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An inlet air conditioning system for a gas turbine, the system comprising:
    an inlet duct for the gas turbine, the inlet duct comprising an air flow path to provide inlet air to the gas turbine;
    a plurality of vertically distinct sections of evaporative cooling media that are stacked on top of one another to extend across the height of the inlet duct at a common axial point;
    a water inlet located at the top of each of the plurality vertically distinct sections of the evaporative cooling media,
    wherein each water inlet is in parallel to one another;
    a water chiller;
    a circulation pump that circulates water through the water chiller and the evaporative cooling media in series;
    a plurality of valves positioned in parallel with one another,
    wherein one of the plurality of valves is located in each of the water inlets between the vertically distinct sections of the evaporative cooling media and the water chiller; and
    wherein the water chiller is configured to chill the water to below an ambient wet-bulb temperature before the water is circulated to the evaporative cooling media, and
    wherein the circulation pump is configured to control the flow rate of the water circulated through the evaporative cooling media to concurrently provide a section of predominantly evaporative cooling and a section of predominantly sensitive cooling within the height of the evaporative cooling media.

2. The inlet system according to claim 1, wherein the water chiller is configured to chill the water so that the water is delivered to the evaporative coding media between 10 to 40 degrees Fahrenheit below the ambient wet-bulb temperature.

3. The inlet system according to claim 1, wherein the inlet system is configured to deliver between 0.5 and 10 gallons of water per minute per square foot of area of the top of the evaporative cooling media to the evaporative cooling media.

4. The inlet system according to claim 1, wherein the inlet system is configured to deliver between 1 and 2 gallons of water per minute per square foot of area of the top of the evaporative cooling media to the evaporative cooling media.

5. The inlet system according to claim 1, further comprising a water tank and a recirculation loop, wherein the recirculation loop connects the water chiller, the circulation pump and the water tank in series.

6. The inlet system according to claim 5, wherein system is configured to flow the water into the water tank (1) from the evaporative cooling media and (2) from the chiller without flowing through the evaporative cooling media.

7. A power plant comprising:
    a gas turbine, the gas turbine including a compressor, a combustion system, and a turbine section;
    a mechanical or electrical load; and
    an inlet system for the gas turbine, the inlet system comprising:
        an inlet duct comprising an air flow path to provide inlet air to the gas turbine;
        a plurality of vertically distinct sections of evaporative cooling media that are stacked on top of one another to extend across the height of the inlet duct at a common axial point;
        a water inlet located at the top of each of the plurality of vertically distinct sections of the evaporative cooling media, wherein each water inlet is in parallel to one another;
        a water chiller;
        a circulation pump that circulates water through the water chiller and the evaporative cooling media in series; and
        a plurality of valves positioned in parallel with one another, wherein one of the plurality of valves is located in each of the water inlets between the vertically distinct sections of evaporative media and the water chiller;
    wherein the water chiller is configured to chill the water to below an ambient wet-bulb temperature before the water is circulated to the evaporative cooling media, and
    wherein the circulation pump is configured to control the flow rate of the water circulated through the evaporative cooling media to simultaneously provide a section of predominantly evaporative cooling and a section of predominantly sensitive cooling within the height of the evaporative cooling media.

8. The power plant according to claim 7, wherein the evaporative cooling media is optimized based upon a desired effectiveness $\eta$, $$\eta=[x_1/(x_1+x_2+x_3)]\eta_1+[x_2/(x_1+x_2+x_3)]\eta_2+[x_3/(x_1+x_2+x_3)]\eta_3,$$

$\eta_3<\eta_2<\eta_1$ and $\eta_3<\eta<\eta_1$, $x_1$ is a section of the height of the evaporative cooling media where air that passes through the evaporative cooling media is cooled predominantly by sensitive cooling and corresponds to $\eta_1$, $x_2$ is a section of the height of the evaporative cooling media where air that passes through the evaporative cooling media is cooled by a mix of evaporative cooling and sensitive cooling and corresponds to $\eta_2$, and $x_3$ is a section of the height of the evaporative cooling media where air that passes through the evaporative cooling media is cooled predominantly by evaporative cooling and corresponds to $\eta_3$.

9. The power plant according to claim 7, wherein the height of the evaporative cooling media is optimized to provide a combination of evaporative and sensitive cooling.

10. A power plant comprising:
    a gas turbine, the gas turbine including a compressor, a combustion system, and a turbine section;
    a mechanical or electrical load; and
    an inlet system for the gas turbine, the inlet system comprising:
        an inlet duct comprising an air flow path to provide inlet air to the gas turbine;
        a plurality of vertically distinct sections of evaporative cooling media that are stacked on top of one another to extend across the height of the inlet duct at a common axial point;
        a water inlet located at the top of each of the plurality of vertically distinct sections of the evaporative cooling media, wherein each water inlet is in parallel to one another;

a water chiller; and a plurality of valves positioned in parallel with one another, wherein one of the plurality of valves is located in each of the water inlets between the vertically distinct sections of evaporative media and the water chiller; and a circulation pump that circulates water through the water chiller and the evaporative media in series, wherein the chiller is configured to chill the water to below an ambient wet-bulb temperature before the water is circulated to the evaporative cooling media, and wherein the inlet system is configured so that all water that is delivered to the evaporative cooling media for conditioning the inlet air is chilled in every cooling mode.

11. The power plant according to claim 10, wherein the height of the evaporative cooling media and the water circulated through the chiller concurrently provide a section of predominantly evaporative cooling and a section of predominantly sensitive cooling within the height of the evaporative cooling media.

12. The power plant according to claim 10, wherein the water chiller is configured to chill the water so that the water is delivered to the evaporative cooling media between 10 to 40 degrees Fahrenheit below the ambient wet-bulb temperature.

13. The power plant according to claim 10, wherein the inlet system is configured to deliver between 0.5 and 10 gallons of water per minute per square foot of area of the top of the evaporative cooling media to the evaporative cooling media.

14. The power plant according to claim 10, wherein the height of the evaporative cooling media is optimized to provide a combination of evaporative and sensitive cooling.

* * * * *

UNITED STATES PATENT AND TRADEMARK OFFICE
CERTIFICATE OF CORRECTION

PATENT NO. : 9,850,816 B2
APPLICATION NO. : 14/071122
DATED : December 26, 2017
INVENTOR(S) : Zhang et al.

Page 1 of 1

It is certified that error appears in the above-identified patent and that said Letters Patent is hereby corrected as shown below:

In the Claims

Claim 2, Column 9, Line 47, change "coding" to --cooling--

Signed and Sealed this
Twenty-second Day of May, 2018

Andrei Iancu
*Director of the United States Patent and Trademark Office*